United States Patent
Matsumoto (10) Patent No.: US 7,835,624 B2
(45) Date of Patent: Nov. 16, 2010

(54) RECORDING AND REPRODUCING APPARATUS

(75) Inventor: Shinsuke Matsumoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1580 days.

(21) Appl. No.: 11/133,462

(22) Filed: May 20, 2005

(65) Prior Publication Data
US 2005/0259970 A1 Nov. 24, 2005

(30) Foreign Application Priority Data
May 21, 2004 (JP) .......................... P2004-152248

(51) Int. Cl.
- H04N 5/91 (2006.01)
- H04N 5/00 (2006.01)
- H04N 7/00 (2006.01)
- H04N 7/26 (2006.01)

(52) U.S. Cl. ............................. 386/95; 386/83; 386/96; 386/111; 386/125

(58) Field of Classification Search ................... 386/95, 386/83, 96, 111, 125, E5.024, E5.026, E5.064, 386/5.07, E9.013, E9.04, E9.041; G09B 19/001, G09B 27/012, 27/019, 27/021, 27/027, 27/029, G09B 27/033, 27/05, 27/051, 27/052
See application file for complete search history.

(56) References Cited

U.S. PATENT DOCUMENTS 6,259,858 B1 * 7/2001 Ando et al. .................... 386/95
6,553,180 B1 * 4/2003 Kikuchi et al. ................ 386/95
6,584,277 B2 * 6/2003 Tsumagari et al. ............ 386/95
2003/0175016 A1 * 9/2003 Mori et al. .................... 386/95

FOREIGN PATENT DOCUMENTS

| JP | 2000-182359 | 6/2000 |
|----|-------------|--------|
| JP | 2002/140865 | 5/2002 |
| JP | 2002/157861 | 5/2002 |
| JP | 2004-30799  | 1/2004 |

* cited by examiner

Primary Examiner—Thai Tran
Assistant Examiner—Syed Y Hasan
(74) Attorney, Agent, or Firm—Morgan, Lewis & Bockius LLP

(57) ABSTRACT

A recording and reproducing apparatus for recording a video signal on an optical disc using a video recording (VR) format and for reproducing the optical disc in which the video signal is recorded in the VR format, the recording and reproducing apparatus includes an extension information recording means for generating extension information including character string information representing an input character string and correspondence information representing an object to which that the character string corresponds, and for recording the extension information on the optical disc. An upper limit of a number of characters of the character string represented by the character string information is made to be limitless, while a program and a cell in an original program chain, and a program and a cell in a user-defined program chain are included in the object to be corresponded by means of the correspondence information.

6 Claims, 7 Drawing Sheets

FIG. 5A

| THIRD INFORMATION | FIRST INFORMATION | SECOND INFORMATION | NUMBER OF CHARACTER | CHARACTER STRING |
|---|---|---|---|---|
| DVD | — | — | N1 | ABC·· |

FIG. 5B

| THIRD INFORMATION | FIRST INFORMATION | SECOND INFORMATION | NUMBER OF CHARACTER | CHARACTER STRING |
|---|---|---|---|---|
| ORIGINAL PROGRAM CHAIN | 2 | 3 | N2 | DEF·· |

FIG. 5C

| THIRD INFORMATION | FIRST INFORMATION | SECOND INFORMATION | NUMBER OF CHARACTER | CHARACTER STRING |
|---|---|---|---|---|
| ORIGINAL PROGRAM CHAIN | 2 | 0 | N3 | GHI·· |

FIG. 5D

| THIRD INFORMATION | FIRST INFORMATION | SECOND INFORMATION | NUMBER OF CHARACTER | CHARACTER STRING |
|---|---|---|---|---|
| USER-DEFINED PROGRAM CHAIN | 1 | 4 | N4 | JKL·· |

FIG. 5E

| THIRD INFORMATION | FIRST INFORMATION | SECOND INFORMATION | NUMBER OF CHARACTER | CHARACTER STRING |
|---|---|---|---|---|
| USER-DEFINED PROGRAM CHAIN | 3 | 0 | N5 | MNO·· |

RECORDING AND REPRODUCING APPARATUS

BACKGROUND OF THE INVENTION

1. Field of the Invention

The present invention relates to a recording and reproducing apparatus, which records video signals on an optical disc using a VR (Video Recording) format and reproduces the optical disc in which the video signals are recorded in the VR format.

2. Description of the Related Art

In DVD players, which are widely used in recent years, a compression technique based on MPEG2 is used for compression of video signals. The video compression technique based on the MPEG2 standard is also used for a VR format, which is a standard of DVD recorders, which allow users to record analog video signals in a digitized manner. As such, in the VR format allowing the users to record the video signals in the digitized manner, the recorded video signals are managed either by an original program chain or a user-defined program chain (play list). That is, in the original program chain, each of the recorded video signals, which have been continuous at the time of recording, is managed as a program. On the other hand, in the user-defined program chain, video signals, which have been continuous at the time of recording, are arbitrarily divided into blocks, that is, cells, and a group of the cells that is randomly ordered by a user is managed as a program chain. In addition, the character string (text information), which is represented with data in the range of 64 bytes or less, can be recorded in any format of a program in the original program chain, a program chain in the user-defined program chain, and a DVD (hereinafter referred to as a first related art).

In addition, a technique of extending the VR format has been proposed as follows (hereinafter referred to as a second related art). That is, in this technique, it is disclosed that 'an exclusive function not in the range of functions defined as the above standard works only at a driver (information recording and reproducing apparatus) of a specific manufacturer, and when information relating to the exclusive function is recorded on the information recording medium (optical disc 1001), the information can be recorded in a recording area of specific information 2002, which only the specific manufacturer can use. Further, the specific information 2002 that only the specific manufacturer can use is recorded on a different region on the information recording medium (optical disc 1001) from a recording region of the common information 2001 based on the standard. Among information that can be reproduced only by the driver (information recording and reproducing apparatus) of the specific manufacturer, contents-related information such as video information, still picture information, voice information is defined as specific object information 2008 reproduced only by the specific manufacturer. Information necessary for managing and controlling the specific object information (specific contents information) 2008 that can be used only by the specific manufacturer is defined as management and control information 2006 that can be used only by the specific manufacturer' (for example, refer to JP-A-2002-140865, [0193] and FIG. 12).

In addition, another technique is disclosed hereinafter (referred to as a third related art). In this technique, it is disclosed that 'a data structure (format structure) is provided, which allows video information, still picture information and/or voice information to be recorded together on the same information medium, and allows any region among the video information, the still picture information, and the voice information to be reproduced in an arbitrary order, so that cells #2, #3, and #6 are defined, which designates a reproduction range from a start position to an end position with respect to each of audio VOB (AOB) #A to #C in the similar way to the video information within the conventional RTR standard (movie VOB31 of FIG. 1 (N))'. And the voice information (audio VOB #A to #C) is taken as the completely same column as cell #1 indicating the reproduction range from a start position to an end position of the video information (movie VOB31) or as cell #4 indicating the reproduction range from a start position to an end position of the still picture information (still picture VOB21) (See JP-A-2002-157861, [0004] and [0022]).

However, the first related art has the following problems. That is, when an explanatory text is added to a program of an original program chain or a program chain of a user-defined program chain in order to easily recognize the contents of recorded information after the video information is recorded, text information must be prepared with data in the range of 64 bytes or less. Accordingly, when the character string to be added to the program or the program chain includes Chinese characters, the text information should be made with only thirty two characters, thereby it is difficult to facilitate the recognition of the program or the program chain with the character string. In addition, in the case of cells, the explanatory text cannot be added, thereby it is impossible to explain the contents of the recorded information in detail.

The second related art just discloses a structure of information recording, which allows information recording only when a driver (information recording and reproducing apparatus) of the specific manufacturer carries out its exclusive function not in the range of the function defined by the standard, thereby it is difficult to apply the second related art to solve the problems of the first related art, that is, it is difficult to facilitate the recognition of the contents of the program or the program chain, and it is impossible to add the explanatory text to the cell.

In addition, the third related art just discloses the data structure (format structure), which allows video information, still picture information and/or voice information to be recorded together on the same information medium, and allows any region among video information, still picture information and voice information to be reproduced in an arbitrary order. Accordingly, it is difficult to apply the second related art to solve the problem of the first related art, that is, it is difficult to facilitate the recognition of the contents of the program or the program chain, and it is impossible that add the explanatory text to the cell.

The present invention has been originated to overcome the above-described problems, and an advantage of the present invention is to provide a recording and reproducing apparatus, which allows text information indicating contents of cells to be recorded, and removes the limitation in the number of characters of the character string for representing the recorded contents of the optical disc, programs, recorded contents of the program chain, or recorded contents of the cells, and suppresses the complexity of the extension information, and allows the optical disc in which the extension information is recorded to be used in an apparatus having no extension information, and reproduces a program readily from a target position.

Another advantage of the present invention is to provide a recording and reproducing apparatus, which generates extension information including character string information, which represents text information input by a user, and correspondence information, which represents an object corresponded to the character string, and records the extension information on an optical disc, and remove the upper limit of the number of characters of the character string, and corresponds a program and a cell in an original program chain and a program chain and a cell in a user-defined program chain included in the object to the character string in the correspondence information so that the character string representing the contents of the cell can be recorded and the limit of the number of the characters of the character string for representing recorded contents of the cell or recorded contents of the program or the program chain can be removed.

In addition to the above-described advantages, still another advantage of the present invention is to provide a recording and reproducing apparatus, which configures information for making the character string corresponded to the object with first information representing the number of the program in the original program chain or the number of the program chain in the user-defined program chain and second information representing the number of the cell, and makes the character string corresponded to the corresponding program or the program chain when the second information represents zero so that the complexity can be suppressed by making unnecessary the information for determining whether the corresponding object is any one among the program, the program chain or the cell.

In addition to the above-described advantages, a further advantage of the present invention is to provide a recording and reproducing apparatus, which allows an area where the extension information is recorded to be represented as an empty area in volume/file structure information, which represents the usage state of the data area, so that the optical disc where the extension information is recorded can also be used in an apparatus which does not use the extension information.

In addition to the above-described advantages, a still further advantage of the present invention is to provide a recording and reproducing apparatus, which can facilitate reproduction from a target position.

SUMMARY OF THE INVENTION

In order to achieve the above-mentioned advantages, the present invention provides a recording and reproducing apparatus for recording a video signal on an optical disc using a video recording (VR) format and for reproducing the optical disc in which the video signal is recorded in the VR format, including an extension information recording means for generating extension information including character string information representing an input character string and correspondence information representing an object to which the character string corresponds, to record the extension information on the optical disc, and an extension information display means for displaying the extension information read from the optical disc. An upper limit of a number of characters of the character string represented by the character string information is made to be limitless, and programs and cells in the optical disc main body and an original program chain, and programs and cells in a user-defined program chain are included in the object to be corresponded by means of the correspondence information, and the correspondence information includes third information, first information representing the program number in the original program chain or the program chain number in the user-defined program chain, and second information representing the cell number. When the third information represents the optical disc itself, the character string corresponds to the optical disc itself, and when the third information represents the original program chain or the user-defined program chain and when the second information has a value other than zero, the character string represents the corresponding cell within the corresponding program or the corresponding cell within the corresponding program chain, and when the third information represents the original program chain or the user-defined program chain and when the second information has a value of zero, the character string corresponds to the corresponding program or the corresponding program chain, and an area where the extension information is recorded by the extension information recording means is a predetermined area within a data area, and an area where the extension information is recorded is represented as an empty area in volume/file structure information representing a usage state of the data area. When reproduction is indicated at a state when the object corresponded to the character string of the extension information displayed by an extension information display means is indicated by the cursor, the object indicated by a cursor is reproduced.

That is, the contents of the program or the cell in the optical disc or the original program chain, or the contents in the program chain or the cell in the user-defined program chain can be described using text information including a limitless number of characters. In addition, the character string can be corresponded to the program in the original program chain or the program chain in the user-defined program chain by making the value of the second information zero. In addition, a recording position of the extension information in the apparatus can be identified by the extension information, and the extension information is taken as the information not recorded even when the extension information is actually recorded in the apparatus which does not use the extension information. In addition, by indicating by means of a cursor the program or the program chain or the cell to which the character string is displayed to be corresponded, reproduction can be initiated from a target position.

In addition, the recording and reproducing apparatus according to another aspect of the invention is applied to a recording and reproducing apparatus for recording a video signal on an optical disc using a video recording (VR) format and for reproducing the optical disc in which the video signal is recorded in the VR format, including an extension information recording means for generating extension information including character string information representing an input character string and correspondence information representing an object to which that the character string corresponds, to record the extension information on the optical disc. An upper limit of a number of characters of the character string represented by the character string information is made to be limitless, while programs and cells in an original program chain, and programs and cells in a user-defined program chain are included in the object to be corresponded by means of the correspondence information. That is, the character string including a limitless number of characters is used for the programs and cells in the original program chain and the programs and cells in the user-defined program chain, so that their respective contents can be described.

In addition to the above-described configuration, the correspondence information has first information representing the program number in the original program chain or the program chain number in the user-defined program chain, and second information representing the cell number. When the second information has a value other than zero, the character string corresponds to the corresponding cell within the corresponding program or the corresponding cell within the corresponding program chain and when the second information has a value of zero, the character string corresponds to the corresponding program or the corresponding program chain. That is, by making the value of the second information zero, the character string can be corresponded to the program in the original program chain or the program chain in the user-defined program chain.

In addition to the above-described configuration, an area where the extension information is recorded by the extension information recording means is a predetermined area within a data area, and an area where the extension information is recorded is represented as an empty area in volume/file structure information representing a usage state of the data area. That is, a recorded position of the extension information can be identified in an apparatus using the extension information. Meanwhile, the extension information is taken as the information that is not recorded even when the extension information is actually recorded in an apparatus that does not use the extension information.

In addition to the above-described configuration, an area where the extension information is recorded by the extension information recording means is the most inner peripheral area among areas within the data area represented as empty areas in volume/file structure information representing a usage state of the data area, and an area where the extension information is recorded in the volume/file structure information is represented as an empty area. That is, a recorded position of the extension information can be identified even when the information is taken as the information that is not recorded in the volume/file structure information in an apparatus using the extension information. Meanwhile, the extension information is taken as the information that is not recorded even when the extension information is actually recorded in an apparatus that does not use the extension information.

In addition to the above-described configuration, when reproduction is indicate data state when the object corresponded to the character string of the extension information displayed by an extension information display means is indicated by the cursor, the object indicated by a cursor is reproduced. That is, by indicating with a cursor the program, the program chain, or the cell which is represented with the corresponding character string, reproduction can be initiated from a target position.

According to the present invention, the contents of optical disc, program, program chain, or cell can be described with a character string including a limitless number of characters. In addition, the character string can be corresponded to either the program or the program chain only by making the value of a second information zero, where the second information does not represent the cell. In addition, a recording position of extension information in the apparatus can be identified by using the extension information, and the extension information is made not to be recorded even when the extension information is actually recorded in the apparatus which does not use the extension information. In addition, by making indicated the program, program chain, or the cell displayed with the corresponding character string, reproduction can be initiated from a target position. Accordingly, recorded contents of the cell can be represented with the character string, limitation on the number of characters of the character string for representing recorded contents of the cell or recorded contents of the program or the program chain or recorded contents of the optical disc itself can be removed, complexity of the extension information can be suppressed, the optical disc having the recorded extension information can also be used in an apparatus that does not use the extension information, and reproduction can be readily initiated from a target position.

In addition, according to the present invention, contents of the program, the program chain, and the cell can be described using text information including limitless characters, so that recorded contents of the cell can also be represented as the character string, and limitation of the number of characters of the character string for representing recorded contents of the program or the program chain and recorded contents of the cell can be removed.

Furthermore, the value of the second information can be made to a value, zero which does not represent the cell, so that the character string can be made to correspond to any one between the program and the program chain. Accordingly, the information is unnecessary which determines whether the corresponding object is any one between the program and the program chain or the cell, which thus allows complexity of the extension information to be suppressed.

Furthermore, the recorded position of the extension information can be identified in the apparatus using the extension information while the extension information is taken as the information that is not recorded even when it is actually recorded in the apparatus that does not use the extension information. As a result, the recorded position can be used in the apparatus that does not use the extension information.

Furthermore, by indicating with a cursor the program, the program chain, or the cell in which the corresponding object is represented, reproduction can be initiated from a target position, so that the reproduction from the target position can be facilitated.

DETAILED DESCRIPTION OF THE INVENTION

Hereinafter, embodiments of the present invention will be described with reference to the accompanying drawings.

Hereinafter, extension information to be made in an embodiment of the present invention will be described.

The extension information is not defined in a VR format. The extension information is configured such that text information capable of being made using any number of characters can correspond and be recorded to a DVD (the optical disc recited in the claims), a program in an original program chain, a program in a user-defined program chain, or a cell.

Figure 4:
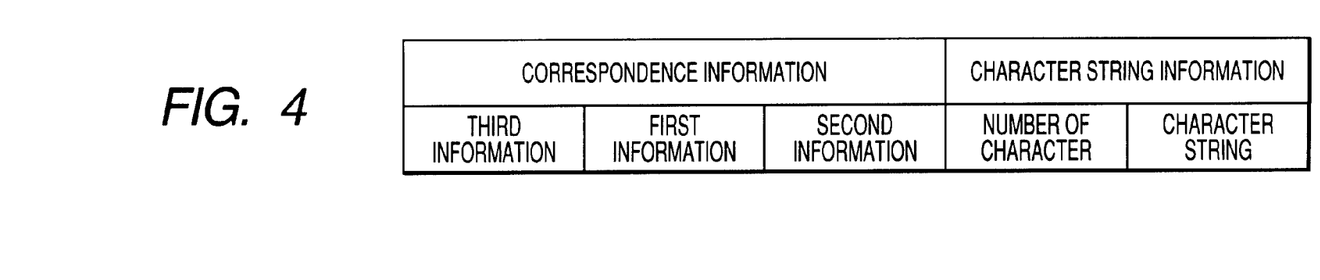
FIG. 4 is an explanatory view illustrating a configuration of extension information.

That is, as shown in FIG. 4, the extension information consists of character string information, which represents a character string, and correspondence information, which represents an object to be corresponded by the character string. Specifically, the character string consists of information representing the number of characters of the character string and information representing the character string itself. In addition, the correspondence information consists of three kinds of information, that is, first to third information. A third information represents the type of an object to be corresponded by the character string among a DVD, an original program chain (original title) and a user-defined program chain (play list), and a first information represents the number of the program in the original program chain or the number of the program chain in the user-defined program chain, and a second information represents the number of the cell.

More specifically, the first information represents the number of program (PG) when the third information represents the original program chain. Or the first information represents the number of program chain (PGC) when the third information represents the user-defined program chain. The second information represents the number of cell in the program or the number of cell in the program chain. Furthermore, when the third information represents the DVD, the first and second information has no meaning.

Figure 6:
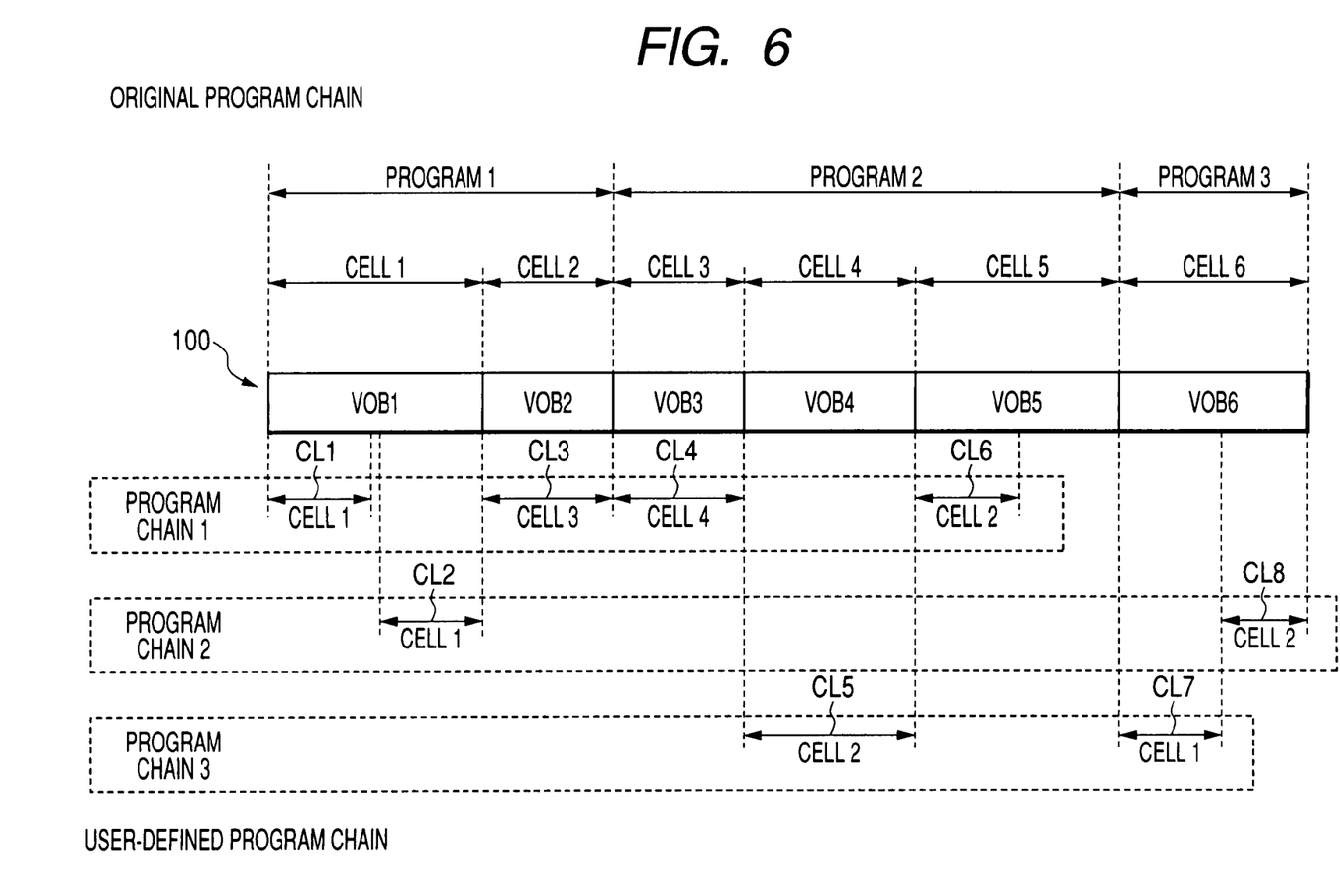
FIG. 6 is an explanatory view illustrating division of a video signal recorded on a DVD.

That is, now, video signals (formed with six video objects VOB1 to VOB6) denoted by reference numeral 100 in FIG. 6 are recorded in a DVD, and the video signals 100 are divided to correspond to cells 1 to 6 in the original program chain. And two cells 1 and 2 among the cells 1 to 6 constitute program 1 in the original program chain, and three cells 3 to 5 constitute program 2, and the cell 6 constitutes program 3.

Meanwhile, the video signals 100 are divided to correspond to eight cells CL1 to CL8 in the user-defined program chain. And four cells of CL1, CL3, CL4, CL6 constitute program chain 1, two cells CL2 and CL8 constitute program chain 2, and two cells CL5 and CL7 constitute program chain 3.

Hereinafter, the extension information to be made when the original program chain and the user-defined program chain are made as the above-described contents will be described in detail.

Figure 5A:
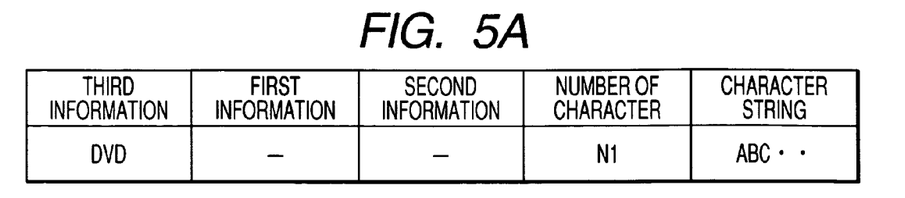
FIG. 5 is an explanatory view illustrating extension information in which values are stored.

When an instruction of corresponding the input character string to the DVD is made, the extension information, in which the third information represents the DVD, is generated as shown in FIG. 5A (the first and second information are unnecessary so that they are ignored, and the input character string (ABC . . . ) is stored in the field of the character string).

Figure 5B:
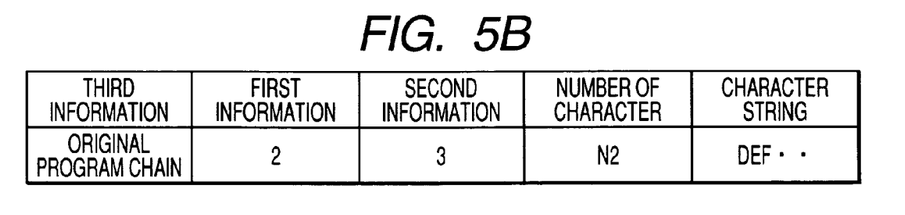

In addition, when an instruction of corresponding the input character string to cell 3 of program 2 in the original program chain is made, the extension information, in which the third information represents the original program chain, is generated, and the first information becomes 2, and the second information becomes 3 as shown in FIG. 5B (the input character string (DEF . . . ) is stored in the field of the character string).

Figure 5C:
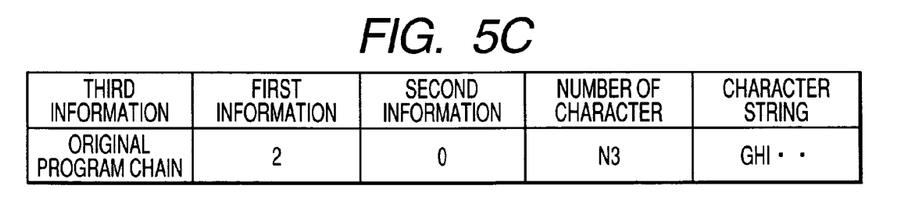

In addition, when an instruction of corresponding the input character string to program 2 in the original program chain, the extension information, in which the third information represents the original program chain, is generated, and the first information becomes 2, and the second information becomes 0 as shown in FIG. 5C. That is, a value representing the number of cell is stored in the field of the second information when the corresponding object is a cell. However, zero is stored in the field of the second information when the corresponding object is a program. In other words, when the field of the second information is stored with zero, it is represented that the corresponding object is a program (the input character string (GHI . . . ) is stored in the field of the character string).

Figure 5D:
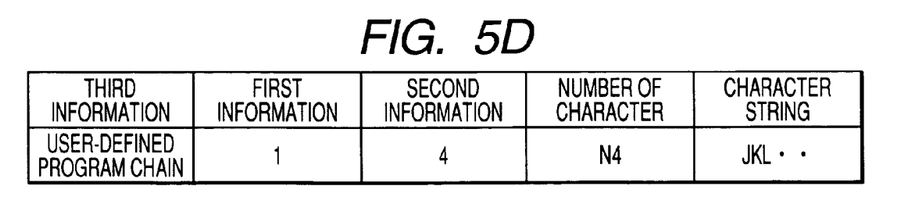

In addition, when an instruction of corresponding the input character string to cell 4 of program chain 1 in the user-defined program chain, the extension information, in which the third information represents the user-defined program chain, is generated, and the first information becomes 1, and the second information becomes 4 as shown in FIG. 5D (the input character string (JKL . . . ) is stored in the field of the character string).

Figure 5E:
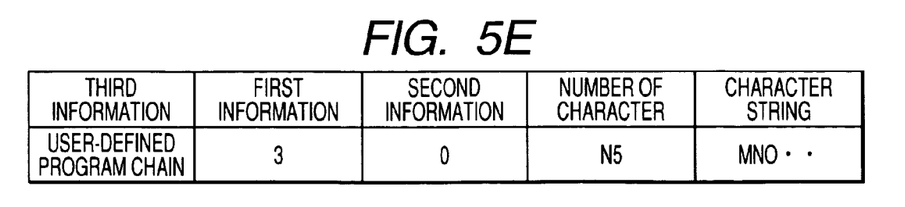

In addition, when an instruction of corresponding the input character string to program chain 3 in the user-defined program chain, the extension information, in which the third information represents the user-defined program chain, is generated, and the first information becomes 3, and the second information becomes 0 as shown in FIG. 5E. That is, the field of the second information is stored with zero, which represented that the corresponding object is a program. In other words, when the field of the second information is stored with zero, it is represented that the corresponding object is a program (the input character string (MNO . . . ) is stored in the field of the character string).

Hereinafter, a complementary explanation will be described.

Figure 8:
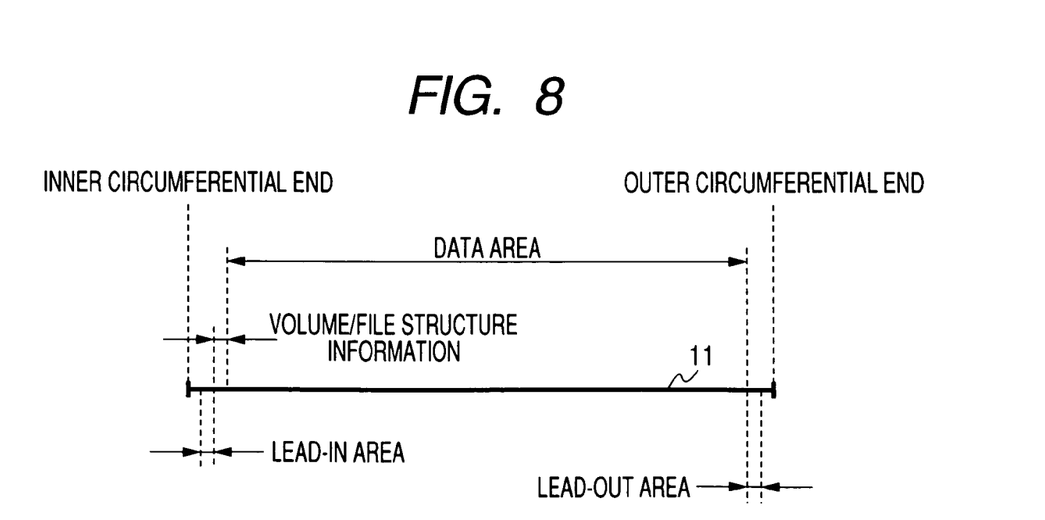
FIG. 8 is an explanatory view illustrating area division of a DVD.

FIG. 8 illustrates an information recording area of a DVD in the VR format, and a lead-in area is formed in the innermost periphery of the DVD 11. In addition, an area for recording volume/file structure information is formed in the outer periphery in contact with the lead-in area. And a data area where information such as video signal is recorded is formed in the outer periphery of the area for recording volume/file structure information, and a lead-out area is formed in the outermost periphery. Furthermore, the volume/file structure information is configured to represent any position and layer structure of any data recorded in the data area. Accordingly, when the volume/file structure information is referred to, it can be seen that which area is used and which area is empty in the data area.

Figure 7:
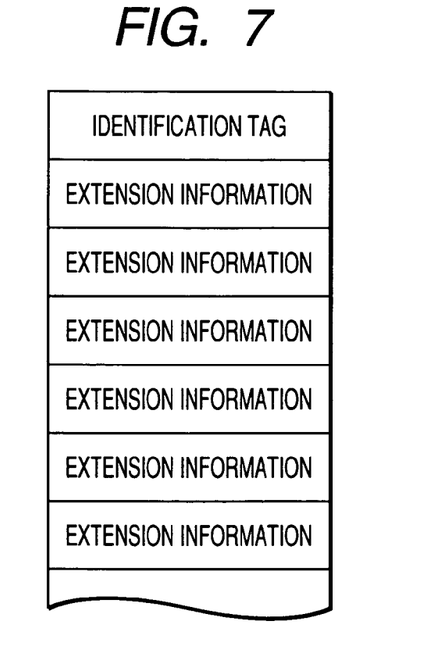
FIG. 7 is an explanatory view illustrating extension information attached with an identification tag.

Referring to the explanation for the extension information, FIG. 7 shows a data structure when the extension information is recorded. That is, the plurality of extension information is combined as data of one file format. And it is attached to an identification tag for identification from other data, and then recorded in a predetermined area within the data area of the DVD (The predetermined area for recording the extension information is an area near the inner periphery which has a high probability of being empty even in many apparatuses (which do not use the extension information) to which the present invention is not applied). However, the area in which the extension information is recorded is represented as an empty area in the volume/file structure information.

To detail this, the extension information is made not to be seen as long as the volume/file structure information is referred to, and is obtained by reading the predetermined area without referring to the volume/file structure information. Accordingly, the extension information has no meaning when the DVD, in which the extension information is recorded, is reproduced in an apparatus, which does not use the extension information. As a result, a DVD having recorded extension information can be reproduced with no trouble even in the apparatus that does not use the extension information. That is, a compatibility with the apparatus, which does not use the extension information, can be ensured.

Figure 3:
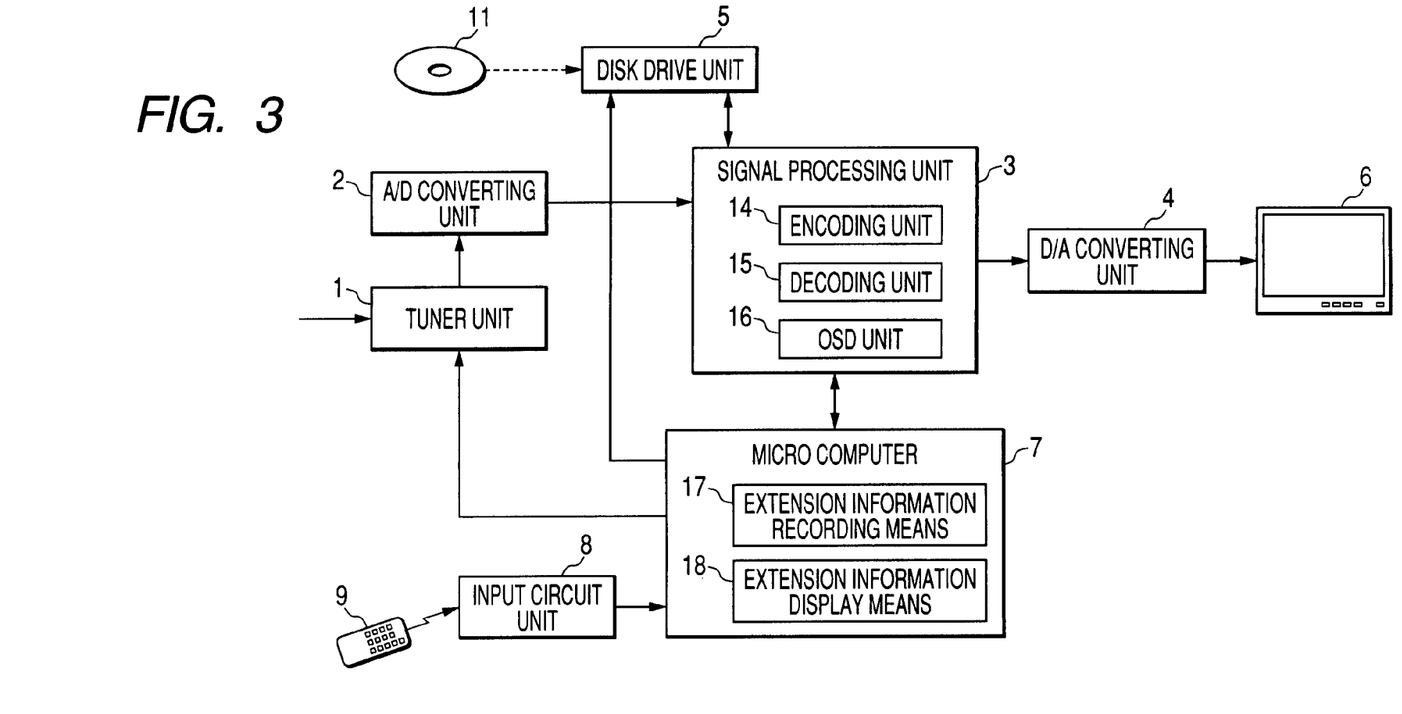
FIG. 3 is a block diagram illustrating an electrical configuration of an embodiment.

FIG. 3 is a block diagram illustrating an electrical configuration of one embodiment of the recording and reproducing apparatus of the present invention, and in particular, shows a DVD recorder. Furthermore, hereinafter, it is assumed that a video signal includes a voice signal.

A tuner unit 1 receives a commercial broadcast of a channel indicated by a microcomputer 7 and outputs a received analog video signal to an A/D converter unit 2. The A/D converter unit 2 converts the analog video signal output from the tuner unit 1 to a digital video signal, and outputs it to a signal processing unit 3. A D/A converter unit 4 converts the digital video signal output from the signal processing unit 3 to an analog video signal, and outputs it to an externally mounted television receiver 6.

A disc drive unit 5 records signals, which are obtained by performing coding or the like on the digital signals (including video signals, extension information or the like in the VR format) output from the signal processing unit 3, on the DVD 11 (which is one recited in the claims, and in particular, DV-D RW, DVD+RW, DVD-RAM or the like). In addition, it reads the digital signals (including the video signals, the extension information or the like in the VR format) recorded in the DVD 11, and performs demodulation, error correction or the like on the digital signals, and then outputs them to the signal processing unit 3.

The signal processing unit 3 compresses the video signals output from the A/D converter unit 2 based on MPEG2 using a coding unit 14. Then it processes the compressed video signals based on the VR format, and outputs them to the disc drive unit 5. In addition, it processes the video signals output from the disc drive unit 5 based on the VR format using a decoding unit 15, and expands them based on MPEG2. And it outputs the digital video signals obtained by the expansion processing to the D/A converter unit 4.

In addition, the signal processing unit 3 generates signals representing characters or symbols indicated by the microcomputer 7, and overlaps them with the video signals using an on-screen display unit 16 (hereinafter, referred to as an OSD). In addition, it reads out extension information, and outputs it to an extension information display means 18 when the extension information is included in a signal output from the disc drive unit 5.

An input circuit unit 8 has a key switch such as a power supply key mounted on the front surface panel of a main body of an apparatus (not shown), or a light receiving unit for receiving ultraviolet light signals transmitted from a remote controller 9, and outputs an input instruction to the microcomputer 8 when the instruction is input from a user.

The microcomputer 7 controls main operations of the DVD recorder. To detail this, it controls a channel received by the tuner unit 1 in response to the user's instruction input from the remote controller 9 or the like. In addition, it makes the program received by the tuner unit 1 recorded on the DVD 11 as a video signal in the VR format by controlling the disc drive unit 5 and the signal processing unit 3. In addition, it makes reproduced the video signal in the VR format recorded in the DVD 11, and then makes it displayed on a television receiver 6.

An extension information recording means 17 (which constitutes a part of functions of the microcomputer 7) generates extension information including character string information representing the character string input by a user and correspondence information representing an object corresponded by the character string. And it controls the signal processing unit 3 and the disc driver unit 5 to record the generated extension information on the predetermined area within the data area of the DVD 11. In addition, in order to make the area having recorded extension information an empty area in the volume/file structure information, which represents the usage state of the data area, it keeps contents of the extension information the same as those before recording in the volume/file structure information even after the extension information is recorded in the predetermined area within the data area.

The extension information display means 18 controls the signal processing unit 3 and the disc drive unit 5 to read the extension information from the predetermined area as the recording area of the extension information, and stores it inside. And it displays the extension information on the television receiver 6 when a display instruction is made by the user. That is, it displays the character string in the extension information and an object corresponded by the character string. And it initiates reproduction from the object designated by a cursor when reproduction is initiated for the displayed object in a state designated by the cursor.

Figure 1:
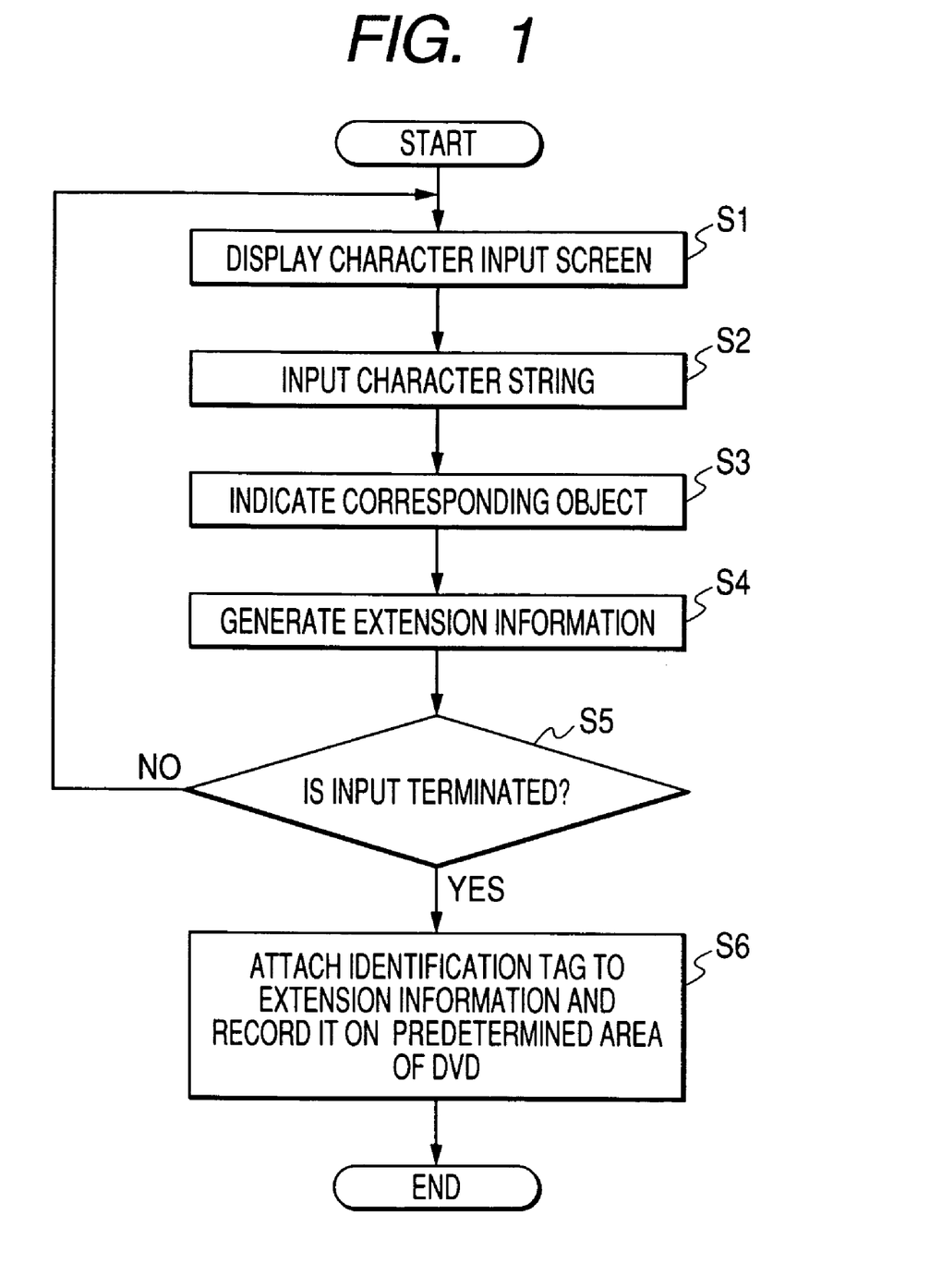
FIG. 1 is a flow chart illustrating main operations of one embodiment of a recording and reproducing apparatus associated with the present invention when extension information is recorded on an optical disc.
Figure 2:
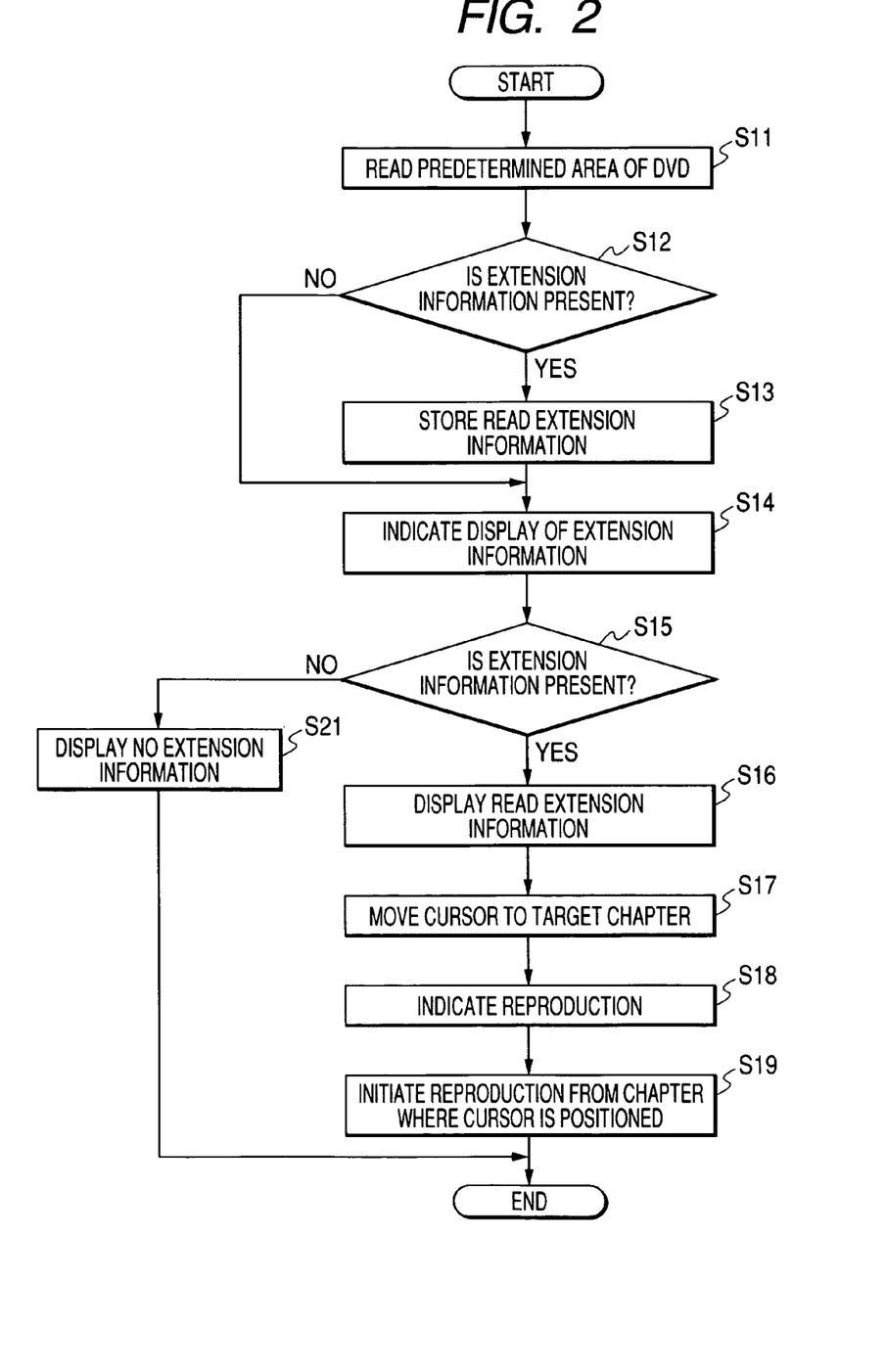
FIG. 2 is a flow chart illustrating main operations of an embodiment when extension information is displayed.

FIG. 1 is a flowchart illustrating main operations of an embodiment when extension information is generated and recorded, and FIG. 2 is a flowchart illustrating main operations of the embodiment when extension information is read and displayed. The Operation of the embodiment will be described with reference to the above drawing.

When a character representing the contents of cells within a program or a program in the original program chain of the recorded program is input, or when a character representing the contents of cells within the program chain or the program chain in the user-defined program chain of the recorded program is input, or when a character representing the contents of the recording-terminated DVD is input after the program received by the tuner unit 1 is recorded on the DVD 11, a key operation for displaying a screen of the character input is performed on the remote controller 9. When this key operation is performed, the extension information recording means 17 displays the screen for inputting the character string on the television receiver 6 (step S1).

In a state when the screen for inputting the character string is displayed, the user inputs the character string for representing the program (or the program chain) or the contents of the cells (step S2). And the user indicates the program (or the program chain) corresponding to the input character string, or the cell corresponding to the input character string (step S3). Furthermore, methods for indicating the object to be corresponded may include a method of selecting a thumbnail-displayed image using a cursor, a method of indicating the program (or the program chain) or the cell corresponding to the character string from the program or the cell where the characters are displayed, or a method of making the character string correspond to the object by inputting a value representing the program (or the program chain) or a value representing the cell.

Along with the input of the character string, the extension information recording means 17 generates extension information (see FIGS. 4 and 5) including the character string information and the correspondence information when an object (program, program chain, cell, or DVD) corresponding to the character string is indicated (step S4). And it asks the user whether the input operation be terminated (step S5). When the input of the character string is carried out for the next object, the operation proceeds from step S5 to step S1, after that, the above-described operations are repeated. Meanwhile, when the input of the character string is terminated, the extension information recording means 17 adds the already generated extension information to the data of one file format and attaches an identification tag thereto, and records it on the predetermined area within the data area of the DVD 11 (step S6).

Description on the operations at the time of recording the extension information has been completed, and operations at the time of displaying the extension information will be given hereinafter.

The extension information display means 18 controls the disc drive unit 5 and the signal processing unit 3 to read the information within the predetermined area as an area for recording the extension information when the DVD 11 is mounted on a reproduction position (step S11). When the extension information is read, it stores the read extension information inside (steps S12 and S13). And when an instruction for displaying the extension information is input from the user, the extension information display means displays the stored extension information on the television receiver 6 (steps S14 to S16).

Figure 9:
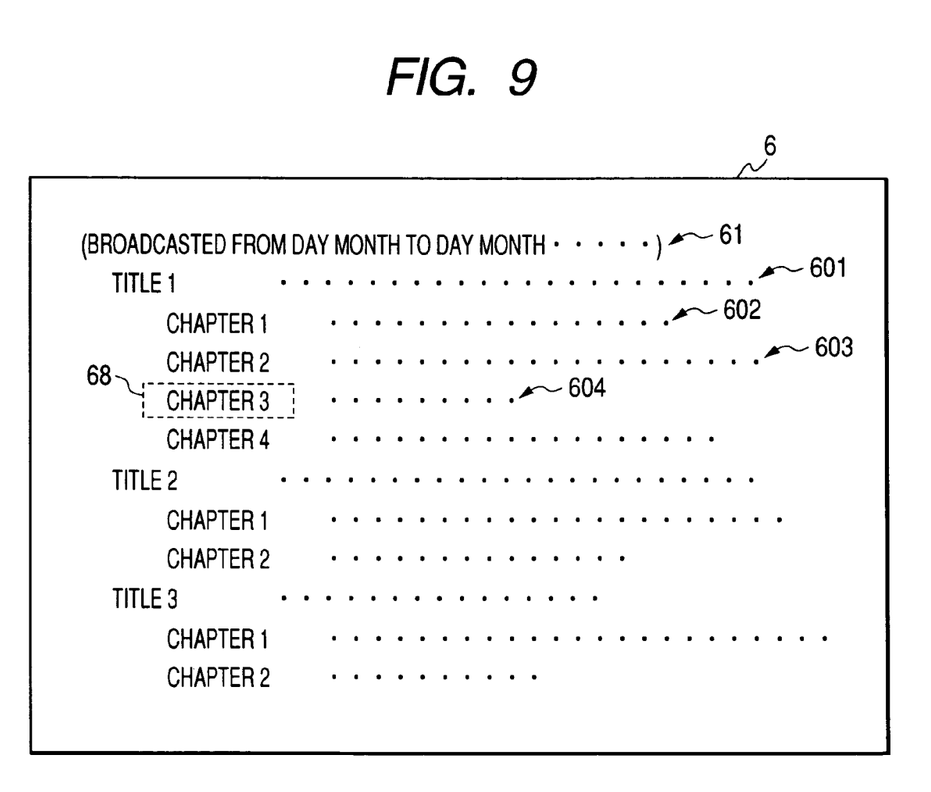
FIG. 9 is an explanatory view illustrating a display of extension information.

FIG. 9 shows an example of extension information displayed on the television receiver 6. That is, the character string 61 corresponding to the DVD is displayed on an upper part of the screen. And text information 601 to 604 respectively corresponding to a title (program chain) and chapters (cells) in response to the user-defined program chain are displayed. In this state, when a key operation representing decision is input (that is, reproduction is indicated) (step S18) after the cursor denoted by a dotted line 68 is moved to a target chapter (or a title) (step S17), the microcomputer 7 initiates reproduction from the chapter (or the title) where the cursor 68 is positioned (step S19).

Furthermore, when the extension information is not read even after the predetermined area as the area for recording the extension information is read, the extension information display means 18 displays a message that the extension information is not recorded when indication of displaying the extension display is input (steps S14, S15, and S21).

In addition, when indication of switching display of the title (program) and the chapter (cell) for the original program chain is input in a state that the title (program chain) and the chapter (cell) in response to the user-defined program chain are displayed, the extension information display means 18 displays the character string corresponding to the title (program) or the chapter (cell) in the original program chain. In addition, when indication of reproduction from the cursor position is input in this state, reproduction of the video signal is initiated in an order in response to the original program chain from the chapter (or title) where the cursor is positioned.

Furthermore, the present invention is not limited to the above-described embodiment, and, although the recording position of the extension information has been described in the case of the predetermined area, other configuration below can be implemented.

To detail this, the extension information recording means 17, in the case of recording the extension information, searches an empty area positioned in the innermost periphery among empty areas referring to the volume/file structure information. And it records the extension information in the empty area positioned in the innermost periphery. And it keeps the volume/file structure information after recording of the extension information the same as the volume/file structure information before recording of the extension information in order to make an empty area the area recorded with the extension information in the volume/file structure information even when the extension information is recorded.

In addition, the extension information display means 18, in a case of reading the extension information from the DVD 11, searches an empty area positioned in the most inner periphery by referring to the volume/file structure information. And it reads the extension information from the empty area positioned in the most inner periphery and stores inside the read extension information. Furthermore, when the extension information is not read at the time of carrying out the reading, it is determined that the extension information is not recorded.

When a recording position of the extension information is determined by the above-described method, an empty area for recording the extension information is necessarily discovered even in the case that the extension information is recorded on the DVD 11 in an apparatus with which the present invention is not associated, thereby the compatibility of the invention with other apparatuses can be improved.

What is claimed is:

1. A recording and reproducing apparatus for recording a video signal on an optical disc using a video recording (VR) format and for reproducing the optical disc in which the video signal is recorded in the VR format, comprising:

an extension information recording means for generating extension information including character string information representing an input character string and correspondence information representing an object to which the character string corresponds, and for recording the extension information on the optical disc; and an extension information display means for displaying the extension information read from the optical disc, wherein a program and a cell in the optical disc main body and an original program chain, and a program and a cell in a user-defined program chain are included in the object to be corresponded by means of the correspondence information, the correspondence information includes third information, first information representing a program number in the original program chain or a program chain number in the user-defined program chain, and second information representing a cell number, when the third information represents the optical disc itself, the character string corresponds to the optical disc itself, when the third information represents the original program chain or the user-defined program chain and when the second information has a value other than zero, the character string represents a corresponding cell within a corresponding program or a corresponding cell within a corresponding program chain, when the third information represents the original program chain or the user-defined program chain and when the second information has a value of zero, the character string corresponds to the corresponding program or the corresponding program chain, an area where the extension information is recorded by the extension information recording means is a predetermined area within a data area, and an area where the extension information is recorded is represented as an empty area in volume/file structure information representing a usage state of the data area, and when reproduction is indicated at a state when the object corresponded to the character string of the extension information displayed by an extension information display means is indicated by the cursor, the object indicated by a cursor is reproduced.

2. A recording and reproducing apparatus for recording a video signal on an optical disc using a video recording (VR) format and for reproducing the optical disc in which the video signal is recorded in the VR format, comprising:

an extension information recording means for generating extension information including character string information representing an input character string and correspondence information representing an object to which that the character string corresponds, and for recording the extension information on the optical disc, wherein while a program and a cell in an original program chain, and a program and a cell in a user-defined program chain are included in the object to be corresponded by means of the correspondence information, the correspondence information has first information representing a program number in the original program chain or a program chain number in the user-defined program chain, and second information representing a cell number, and when the second information has a value other than zero, the character string corresponds to a corresponding cell within a corresponding program or a corresponding cell within a corresponding program chain and when the second information has a value of zero, the character string corresponds to the corresponding program or the corresponding program chain.

3. The recording and reproducing apparatus according to claim 2, wherein an area where the extension information is recorded by the extension information recording means is a predetermined area within a data area, and an area where the extension information is recorded is represented as an empty area in volume/file structure information representing a usage state of the data area.

4. The recording and reproducing apparatus according to claim 2, wherein an area where the extension information is recorded by the extension information recording means is the most inner peripheral area among areas within a data area represented as an empty area in volume/file structure information representing a usage state of the data area, and an area where the extension information is recorded in the volume/file structure information is represented as an empty area.

5. The recording and reproducing apparatus according to claim 2, wherein when reproduction is indicated at a state when the object corresponded to the character string of the extension information displayed by an extension information display means is indicated by the cursor, the object indicated by a cursor is reproduced.

6. A recording and reproducing method for recording a video signal on an optical disc using a video recording (VR) format and for reproducing the optical disc in which the video signal is recorded in the VR format, comprising:

generating extension information including character string information representing an input character string and correspondence information representing an object to which the character string corresponds;

recording the extension information on the optical disc;

displaying the extension information read from the optical disc;

including a program and a cell in the optical disc main body and an original program chain and a program and a cell in a user-defined program chain in the object to be corresponded by means of the correspondence information;

including third information, first information representing a program number in the original program chain or a program chain number in the user-defined program chain, and second information representing a cell number in the correspondence information;

when the third information represents the optical disc itself, corresponding the character string to the optical disc itself;

when the third information represents the original program chain or the user-defined program chain and when the second information has a value other than zero, representing by the character string a corresponding cell within a corresponding program or a corresponding cell within a corresponding program chain;

when the third information represents the original program chain or the user-defined program chain and when the second information has a value of zero, corresponding the character string to the corresponding program or the corresponding program chain;

allocating an area where the extension information is recorded to a predetermined area within a data area, and representing an area where the extension information is recorded as an empty area in volume/file structure information representing a usage state of the data area; and when reproduction is indicated at a state when the object corresponded to the character string of the extension information displayed is indicated by the cursor, reproducing the object indicated by a cursor.

* * * * *